March 8, 1932.   P. BERMAN   1,848,556
CHRISTMAS TREE HOLDER
Filed Oct. 17, 1929   2 Sheets-Sheet 1
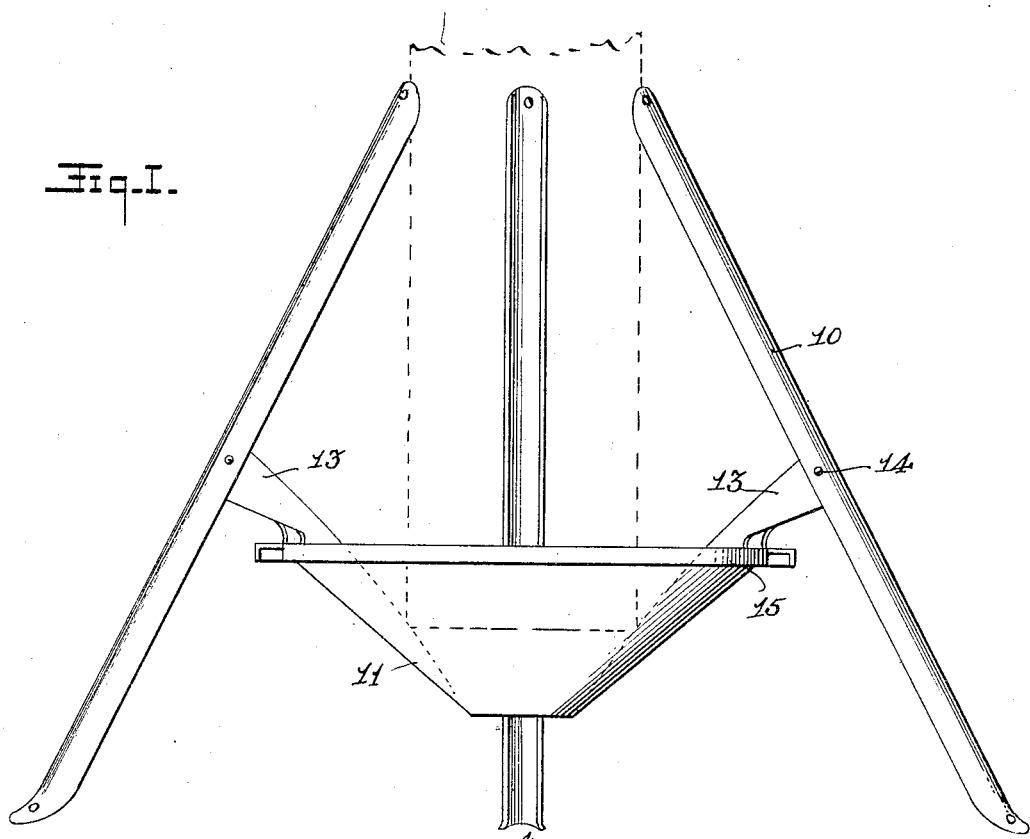
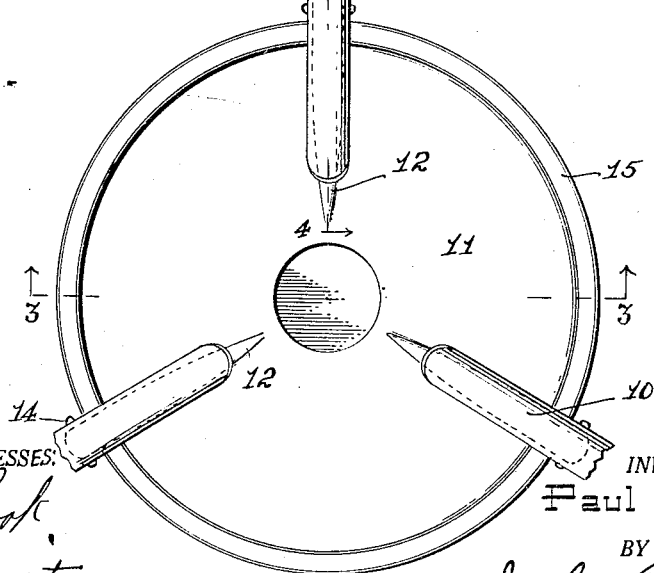

March 8, 1932.  P. BERMAN  1,848,556
CHRISTMAS TREE HOLDER
Filed Oct. 17, 1929   2 Sheets-Sheet 2

WITNESSES:
INVENTOR
Paul Berman
BY
ATTORNEY

Patented Mar. 8, 1932

1,848,556

UNITED STATES PATENT OFFICE

PAUL BERMAN, OF PHILADELPHIA, PENNSYLVANIA, ASSIGNOR TO KOELMEL BROTHERS

CHRISTMAS TREE HOLDER

Application filed October 17, 1929. Serial No. 400,187.

This invention relates to Christmas tree holders and more particularly to an improved means for supporting Christmas trees and preserving the life of same.

One object of this invention is to provide a tree holder having a support for the base of the tree and adapted to hold water whereby the tree may be kept in a fresh condition for a long length of time.

Another object is to provide a Christmas tree holder having a supporting surface formed to provide both a supporting surface and a water container.

A further object is to provide a Christmas tree holder of novel construction and of such simplicity as to render it easy and cheap to manufacture.

According to the invention, the tree holder is provided with legs having a concave support pivotedly connected at intermediate points of the legs. The support is provided with pressed-up ribs within the support for strengthening the same, the ribs project outwardly and upwardly from the support and terminate in channel shape for fastening within the channel shaped legs.

The drawings illustrate an embodiment of this invention and the views therein are as follows:—

Fig. 1 is a side elevational view of the holder embodying the invention.

Fig. 2 is a top plan view of the holder embodying the invention having the lower parts of its legs broken away.

Figure 3:
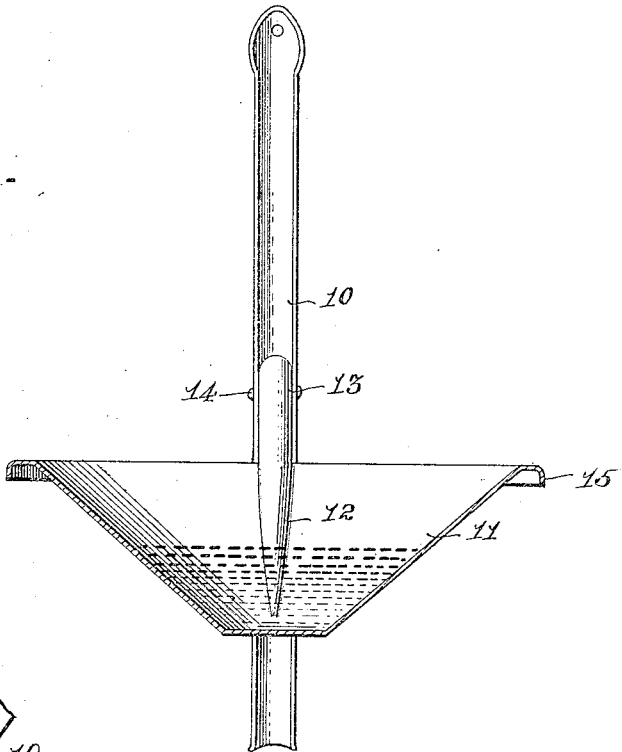
Fig. 3 is a sectional view taken along the line 3—3 of Fig. 2.
Figure 4:
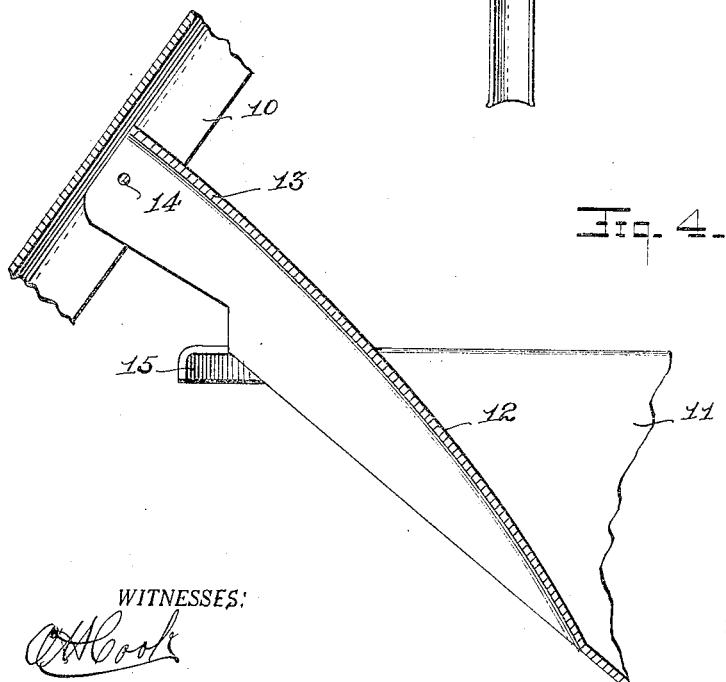
Fig. 4 is a sectional view taken along the line 4—4 of Fig. 2.

Referring to the drawings, 10 indicates the legs of the holder which may be formed from stamped sheet metal blanks and a concave support 11, which for the purpose of this application I have shown as being frustro-conical shaped. This support is provided with pressed-up ribs 12 for reinforcing the same. The pressed-up ribs 12, extend inwardly from the support 11, and above the same and terminate in oblique channel shaped extensions 13, which fit within the channel of the legs 10 and are pivotally connected therein by means 14.

The periphery of the frustro-conical shaped support 11 terminates in a flange portion 15 for further strengthening purposes.

It can be seen that the frustro-conical shaped support 11, will receive practically any size of tree trunk within quite a large range and in addition to acting as a support, it is designed for use as a water container for keeping a tree fresh and green for a long period of time.

The upper end of the legs may be secured to the side of the tree by means of nails or screws. The lower end of the legs may also be fastened to a supporting surface by means of nails and screws.

Each part of the present tree holder may be stamped from sheet metal and since the parts are few in number, this invention produces a very simple, strong, and durable combination tree holder and moisture container for supporting and lengthening the life of a tree.

Of course, the Christmas tree holder illustrated may be modified and changed in various ways without departing from the invention herein set forth and hereafter claimed.

The invention is hereby claimed as follows:—

1. A supporting stand comprising a frustro-conical shaped vessel having pressed-up ribs therein, said ribs extending outwardly from the vessel and legs pivoted to the extensions of the ribs.

2. A supporting stand comprising a tapered vessel having infolded radial ribs therein, the said ribs extending outwardly and upwardly from the vessel and legs pivoted to the extensions of the ribs at intermediate points of the legs.

3. A tree holder composed of a sheet of material having infolded ribs forming said sheet into a frustro conical vessel, said ribs extending beyond the perimeter and provided with pivots, and legs pivoted to said ribs.

4. A tree holder composed of a sheet of material having infolded radial ribs forming said sheet into a frustro conical vessel, said ribs extending beyond the perimeter and provided with pivots, and tree clamping legs pivoted to said ribs.

5. A tree holder composed of a sheet of material having infolded ribs forming said sheet into a frustro conical vessel, a rim about the perimeter, said ribs extending beyond the perimeter and provided with pivots, said rim being interrupted at the several positions of the ribs, and upwardly converging legs pivoted to said ribs.

6. A tree holder composed of a sheet of material having infolded radial ribs forming said sheet into a frustro conical vessel, a rim about the perimeter, said ribs extending beyond the perimeter and provided with pivots, said rim being interrupted at the several positions of the ribs, and legs pivoted to said ribs diverging below and converging above said rim.

7. A tree holder composed of a sheet of material having infolded ribs forming said sheet into a frustro conical vessel, said ribs extending beyond the perimeter and provided with pivots, and legs fulcrumed at said pivots forming tree clamping extensions above the vessel.

8. A tree holder composed of a sheet of material having infolded radial ribs forming said sheet into a frustro conical vessel, said ribs extending divergingly upwardly beyond the perimeter and provided with pivots, and legs fulcrumed at said pivots.

9. A tree holder composed of a sheet of material having infolded ribs forming said sheet into a frustro conical vessel, a rim about the perimeter, said ribs extending beyond the perimeter and provided with pivots, said rim being interrupted at the several positions of the ribs, and legs fulcrumed at said pivots.

10. A tree holder composed of a sheet of material having infolded radial ribs forming said sheet into a frustro conical vessel, a rim about the perimeter, said ribs extending divergingly upwardly beyond the perimeter and provided with pivots, said rim being interrupted at the several positions of the ribs, and legs fulcrumed at said pivots.

In testimony whereof I have signed my name to this specification.

PAUL BERMAN.